United States Patent
Huang et al.

(10) Patent No.: US 11,493,486 B2
(45) Date of Patent: Nov. 8, 2022

(54) LIQUID CHROMATOGRAPHY REAGENT KIT

(71) Applicant: MSonline Scientific Co.,Ltd., Taipei (TW)

(72) Inventors: Chien-Pang Huang, Taipei (TW); Wei-Chun Huang, Taipei (TW)

(73) Assignee: MSonline Scientific Co., Ltd., Taipei (TW)

( * ) Notice: Subject to any disclaimer, the term of this patent is extended or adjusted under 35 U.S.C. 154(b) by 199 days.

(21) Appl. No.: 17/142,266

(22) Filed: Jan. 6, 2021

(65) Prior Publication Data

US 2021/0215647 A1 Jul. 15, 2021

(30) Foreign Application Priority Data

Jan. 9, 2020 (TW) .................................. 109100683

(51) Int. Cl.
*G01N 30/34* (2006.01)
*G01N 30/02* (2006.01)

(52) U.S. Cl.
CPC ....... *G01N 30/34* (2013.01); *G01N 2030/027* (2013.01)

(58) Field of Classification Search
CPC . G01N 30/34; G01N 2030/027; B01D 15/166
See application file for complete search history.

(56) References Cited

U.S. PATENT DOCUMENTS

2005/0011836 A1* 1/2005 Bidlingmeyer ...... B01D 15/426
210/639

* cited by examiner

*Primary Examiner* — Jennifer Wecker
*Assistant Examiner* — Michael Paul Shimek
(74) *Attorney, Agent, or Firm* — JCIPRNET

(57) ABSTRACT

A liquid chromatography reagent kit includes a mobile phase anti-adsorption concentrate. The mobile phase anti-adsorption concentrate includes a first solvent, a buffer, an acid-base regulating reagent, and an anti-adsorption reagent. A ratio of a molarity of the buffer to a molarity of the acid-base regulating reagent is 400:1 to 1:1. A ratio of the molarity of the buffer to a molarity of the anti-adsorption reagent is 100:1 to 1:2.

20 Claims, 4 Drawing Sheets

LIQUID CHROMATOGRAPHY REAGENT KIT

CROSS-REFERENCE TO RELATED APPLICATION

This application claims the priority benefit of Taiwanese application serial no. 109100683, filed on Jan. 9, 2020. The entirety of the above-mentioned patent application is hereby incorporated by reference herein and made a part of this specification.

BACKGROUND OF THE INVENTION

Field of the Invention

The invention relates to a reagent kit, and more particularly to a liquid chromatography reagent kit suitable for liquid chromatography.

Description of Related Art

Chromatography is a method that may separate, purify, and analyze complex mixtures. In recent years, chromatography has been widely used in various fields and has become one of the important analysis methods for multi-component mixtures, and plays an important role in the scientific field. Chromatography may be classified into gas chromatography (GC) and liquid chromatography (LC) according to mobile phase and stationary phase.

The use of a strong ionic compound in liquid chromatography, such as an anionic functional group with sulfate, phosphate, or the like, or a strong cationic functional group such as secondary amine, tertiary amine, or quaternary amine, may produce a stronger signal during analysis. However, the interaction between strong ionic functional groups causes ions to be adsorbed to (such as bonded to) the metal column or metal surface that they contact during the chromatography process, thus causing sample loss and reducing sensitivity. Therefore, how to improve the sensitivity and effect of liquid chromatography is an urgent issue in the art.

SUMMARY OF THE INVENTION

The invention provides a liquid chromatography reagent kit that may improve the sensitivity of liquid chromatography and improve detection effect.

The liquid chromatography reagent kit of the invention includes a mobile phase anti-adsorption concentrate. The mobile phase anti-adsorption concentrate includes a first solvent, a buffer, an acid-base regulating reagent, and an anti-adsorption reagent. A ratio of a molarity of the buffer to a molarity of the acid-base regulating reagent is 400:1 to 1:1. A ratio of the molarity of the buffer to a molarity of the anti-adsorption reagent is 100:1 to 1:2.

In an embodiment of the invention, the ratio of the molarity of the buffer to the molarity of the acid-base regulating reagent is 40:1 to 10:1, and the ratio of the molarity of the buffer to the molarity of the anti-adsorption reagent is 10:1 to 1:2.

In an embodiment of the invention, the molarity of the buffer is 20 mM to 200 mM.

In an embodiment of the invention, the molarity of the acid-base regulating reagent is 0.5 mM to 20 mM.

In an embodiment of the invention, the first solvent is one selected from a group consisting of water, methanol, ethanol, isopropanol, and acetonitrile.

In an embodiment of the invention, the buffer is one selected from a group consisting of ammonium formate, ammonium acetate, ammonium carbonate, ammonium bicarbonate, ammonium fluoride, and ammonium citrate.

In an embodiment of the invention, the acid-base regulating reagent is one selected from a group consisting of formic acid, acetic acid, citric acid, carbonic acid, and ammonia water.

In an embodiment of the invention, the molarity of the anti-adsorption reagent is at least less than or equal to 5000 mM.

In an embodiment of the invention, the molarity of the anti-adsorption reagent is less than or equal to 400 mM.

In an embodiment of the invention, the liquid chromatography reagent kit further includes a sample return solution. The sample return solution includes a second solvent.

In an embodiment of the invention, the second solvent is one selected from a group consisting of water, methanol, ethanol, isopropanol, and acetonitrile.

In an embodiment of the invention, the anti-adsorption reagent is one selected from a group consisting of formic acid, acetic acid, citric acid, carbonic acid, ammonia water, ammonium formate, ammonium acetate, ammonium carbonate, ammonium bicarbonate, ammonium fluoride, ammonium citrate, sodium formate, sodium acetate, sodium carbonate, sodium bicarbonate, sodium fluoride, and sodium citrate.

In an embodiment of the invention, the liquid chromatography reagent kit further includes a connecting tube and a chromatography column. The chromatography column is connected to the connecting tube. A material of the connecting tube is a non-metallic material. A material of the chromatography column is a non-metallic material.

In an embodiment of the invention, the mobile phase anti-adsorption concentrate is diluted to obtain an operating mobile phase, and in the operating mobile phase, the ratio of the molarity of the buffer to the molarity of the acid-base regulating reagent is 400:1 to 1:1, and the ratio of the molarity of the buffer to the molarity of the anti-adsorption reagent is 100:1 to 1:2.

In an embodiment of the invention, the mobile phase anti-adsorption concentrate is substantially diluted 200-fold to obtain the operating mobile phase.

In an embodiment of the invention, the ratio of the molarity of the buffer to the molarity of the acid-base regulating reagent is 20:1 to 1:1, and the ratio of the molarity of the buffer to the molarity of the anti-adsorption reagent is 100:1 to 5:1.

In an embodiment of the invention, the molarity of the buffer is 20 mM to 500 mM, and the molarity of the acid-base regulating reagent is 20 mM to 100 mM.

In an embodiment of the invention, the molarity of the anti-adsorption reagent is less than or equal to 100 mM.

In an embodiment of the invention, the ratio of the molarity of the buffer to the molarity of the acid-base regulating reagent is 100:1 to 20:1, and the ratio of the molarity of the buffer to the molarity of the anti-adsorption reagent is 10:1 to 1:2.

In an embodiment of the invention, the molarity of the buffer is 20 mM to 200 mM, the molarity of the acid-base regulating reagent is 0.5 mM to 20 mM, and the molarity of the anti-adsorption reagent is less than or equal to 400 mM.

Based on the above, the liquid chromatography reagent kit of an embodiment of the invention adopts an anti-adsorption reagent, and therefore the probability of ions adsorbing to the metal surface they contact during the liquid chromatography process may be reduced, thereby reducing sample loss. In addition, since the anti-adsorption reagent may reduce the adsorption of ions to the metal surface, the detected peak shape may also be improved and delayed peaking may be avoided, thus improving the sensitivity and detection effect of liquid chromatography.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
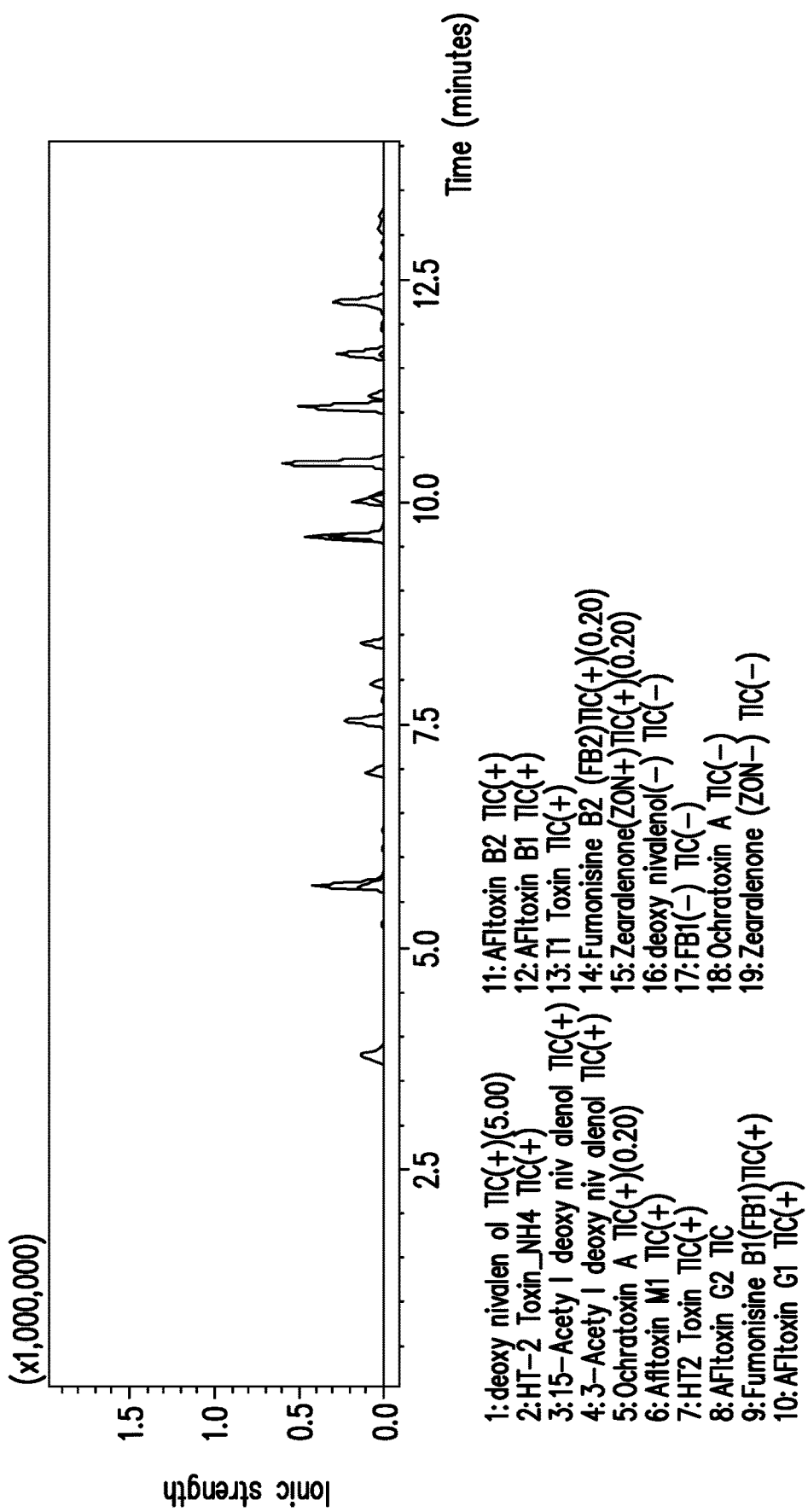
FIG. 1A is a gradient analysis chart obtained by liquid chromatography of various toxins using 0.1% formic acid in Comparative example 1.

Hereinafter, exemplary embodiments of the invention are described in detail, and they may be easily performed by those skilled in the art. However, the invention may be implemented in many different forms, and should not be construed as being limited to the exemplary embodiments set forth herein.

Moreover, regarding expressions of groups (atomic groups) in the present specification, expressions that do not recite substituted and unsubstituted are expressions that include both a group (atomic group) without a substituent and a group (atomic group) having a substituent. For example, the term "alkyl group" includes not only an alkyl group without a substituent (unsubstituted alkyl group) but also an alkyl group having a substituent (substituted alkyl group).

The description of the constituent elements described below may be based on representative embodiments of the invention, and the invention is not limited by such embodiments. Moreover, in the present specification, a numerical range indicated by "-" refers to a range that includes the numerical values before and after "-" as the lower limit and upper limit.

Hereinafter, a liquid chromatography reagent kit according to an embodiment of the invention is described.

The liquid chromatography reagent kit according to an embodiment of the invention includes a mobile phase anti-adsorption concentrate. The mobile phase anti-adsorption concentrate includes a first solvent, a buffer, an acid-base regulating reagent, and an anti-adsorption reagent. In some embodiments, the liquid chromatography reagent kit further includes a sample return solution. The sample return solution includes a second solvent. In some other embodiments, the liquid chromatography reagent kit further includes a connecting tube and a chromatography column. The chromatography column may be connected to the connecting tube, but is not limited thereto.

In the present embodiment, the mobile phase anti-adsorption concentrate includes, for example, a buffer and an acid-base regulating reagent dissolved in the first solvent. In addition, the mobile phase anti-adsorption concentrate may also include an anti-adsorption reagent dissolved in the first solvent. The first solvent may include water or an organic solvent. For example, the first solvent is one selected from a group consisting of water, methanol, ethanol, isopropanol, and acetonitrile, or any combination of the above, but the invention is not limited thereto. In the present embodiment, the water may be deionized water or distilled water, but is not limited thereto. In some embodiments, the first solvent may also include isobutyl alcohol, ether, ketone, or other suitable solvents, but the invention is not limited thereto.

In the present embodiment, the buffer may include a salt, such as a compound in which a metal ion or ammonium ($NH_4^+$) is combined with an acid radical or a non-metal ion. The salt in the present embodiment may include organic salt or inorganic salt. For example, the buffer is, for example, one selected from a group consisting of ammonium formate, ammonium acetate, ammonium carbonate, ammonium bicarbonate, ammonium fluoride, and ammonium citrate, or any combination of the above, or other suitable salts, but the invention is not limited thereto.

In the present embodiment, the molarity of the buffer in the mobile phase anti-adsorption concentrate is 20 mM to 200 mM, but the invention is not limited thereto.

In the present embodiment, the acid-base regulating reagent in the mobile phase anti-adsorption concentrate may include an acid or a base. For example, the acid-base regulating reagent of the present embodiment is, for example, one selected from a group consisting of formic acid, acetic acid, citric acid, carbonic acid, and ammonia water or other suitable acids or bases, but the invention is not limited thereto. In some embodiments, the acid-base regulating reagent may also include phosphoric acid, but is not limited thereto.

In the present embodiment, the molarity of the acid-base regulating reagent in the mobile phase anti-adsorption concentrate is 0.5 mM to 20 mM, but the invention is not limited thereto.

In the present embodiment, the ratio of the molarity of the buffer in the liquid chromatography reagent kit to the molarity of the acid-base regulating reagent is 400:1 to 1:1, but is not limited thereto. In the above molarity ratio range, the liquid chromatography reagent kit of the present embodiment may improve the separation and calibration performance of liquid chromatography, and may improve the sensitivity of liquid chromatography.

In some embodiments, the ratio of the molarity of the buffer to the molarity of the acid-base regulating reagent may be adjusted from 40:1 to 10:1, but is not limited thereto. The ratio of molarity is the molarity ratio of the buffer and the acid-base regulating reagent added in the first solvent. In the above molarity ratio range, the liquid chromatography reagent kit of the present embodiment may improve the separation and calibration performance of liquid chromatography, and may improve the sensitivity of liquid chromatography.

In the present embodiment, the anti-adsorption reagent in the mobile phase anti-adsorption concentrate is one selected from a group consisting of formic acid, acetic acid, citric acid, carbonic acid, ammonia water, ammonium formate, ammonium acetate, ammonium carbonate, ammonium bicarbonate, ammonium fluoride, ammonium citrate, sodium formate, sodium acetate, sodium carbonate, sodium bicarbonate, sodium fluoride, and sodium citrate, or any combination of the above, or other suitable compounds, but the invention is not limited thereto.

It is worth noting that, in the present embodiment, the molarity of the anti-adsorption reagent is at least less than or equal to 5000 mM. Therefore, the molarity of the anti-adsorption reagent is at least less than or equal to 250 times the molarity of the buffer. In some embodiments, the molarity of the anti-adsorption reagent may also be 25 times to 250 times the molarity of the buffer, but is not limited thereto. In some embodiments, the ratio of the molarity of the buffer to the molarity of the anti-adsorption reagent is in the range of 100:1 to 1:2. When the ratio of the molarity of the anti-adsorption reagent to the molarity of the buffer is in the above range, the anti-adsorption reagent may reduce the probability of ions adsorbed to (or bonded to) the metal surface in the liquid chromatography process, so as to reduce sample loss. In addition, since the anti-adsorption reagent may reduce the adsorption of ions to the metal surface, the detected peak shape may also be improved and delayed peaking may be avoided, thus improving the sensitivity and detection effect of liquid chromatography.

In the present embodiment, the sample return solution may be used to dilute the mobile phase anti-adsorption concentrate. The sample return solution includes a second solvent. The second solvent may include water or an organic solvent. For example, the second solvent is one selected from a group consisting of water, methanol, ethanol, isopropanol, and acetonitrile, or any combination of the above, but the invention is not limited thereto. In the present embodiment, the water may be deionized water or distilled water, but is not limited thereto. In some embodiments, the second solvent may also include isobutyl alcohol, ether, ketone, or other suitable solvents, but the invention is not limited thereto. In the present embodiment, the second solvent may be the same as or different from the first solvent, and the invention is not limited thereto.

In the present embodiment, the connecting tube included in the liquid chromatography reagent kit may connect the chromatography column to an autosampler of the liquid chromatography. In other words, the chromatography column may introduce an ionic compound (a mixture including a sample to be tested and the liquid chromatography reagent kit) from the autosampler into the chromatography column for chromatographic separation. In the present embodiment, the material of the connecting tube is a non-metallic material, and the material of the chromatography column is a non-metallic material. For example, the non-metallic material may include glass, rubber, high-molecular polymer, or other suitable materials, but the invention is not limited thereto. Therefore, the liquid chromatography reagent kit of the present embodiment may reduce the contact area between the sample and the metal via the non-metallic chromatography column and the connecting tube, and further reduce the probability of the ions in the sample adsorbing to the metal surface. In addition, the anti-adsorption reagent in the mobile phase anti-adsorption concentrate may be continuously applied to the sample channel of the liquid chromatography by the flow of the mobile phase. Therefore, in the part where the sample is in contact with the metal surface in the liquid chromatography, the sample may be protected by the anti-adsorption reagent to reduce and/or avoid the adsorption of the ions in the sample to the metal surface so as to reduce sample loss and improve the sensitivity and detection effect of liquid chromatography.

In the following, various compounds of Example 1 to Example 3 and Comparative example 1 to Comparative example 3 were separated by liquid chromatography. The features of the invention are more specifically described in the following with reference to Example 1 to Example 3 and Comparative example 1 to Comparative example 3. Although the following Example 1 and Example 3 are described, the materials used and the amount and ratio thereof, as well as handling the details and the handling process . . . etc., may be suitably modified without exceeding the scope of the invention. Accordingly, restrictive interpretation should not be made to the invention based on the examples described below.

Comparative Example 1

FIG. 1A is a gradient analysis chart obtained by liquid chromatography of various toxins using 0.1% formic acid in Comparative example 1. In Comparative example 1, a mixture of formic acid, water, and methanol was used to obtain a mobile phase of 0.1% formic acid.

Then, various toxin samples to be tested were dissolved in the mobile phase to form a solution to be tested.

Next, the solution to be tested was loaded by a metal connecting tube and a metal chromatography column for liquid chromatography, and detected by a mass spectrometer, to obtain the gradient analysis chart of FIG. 1A.

Example 1

Figure 1B:
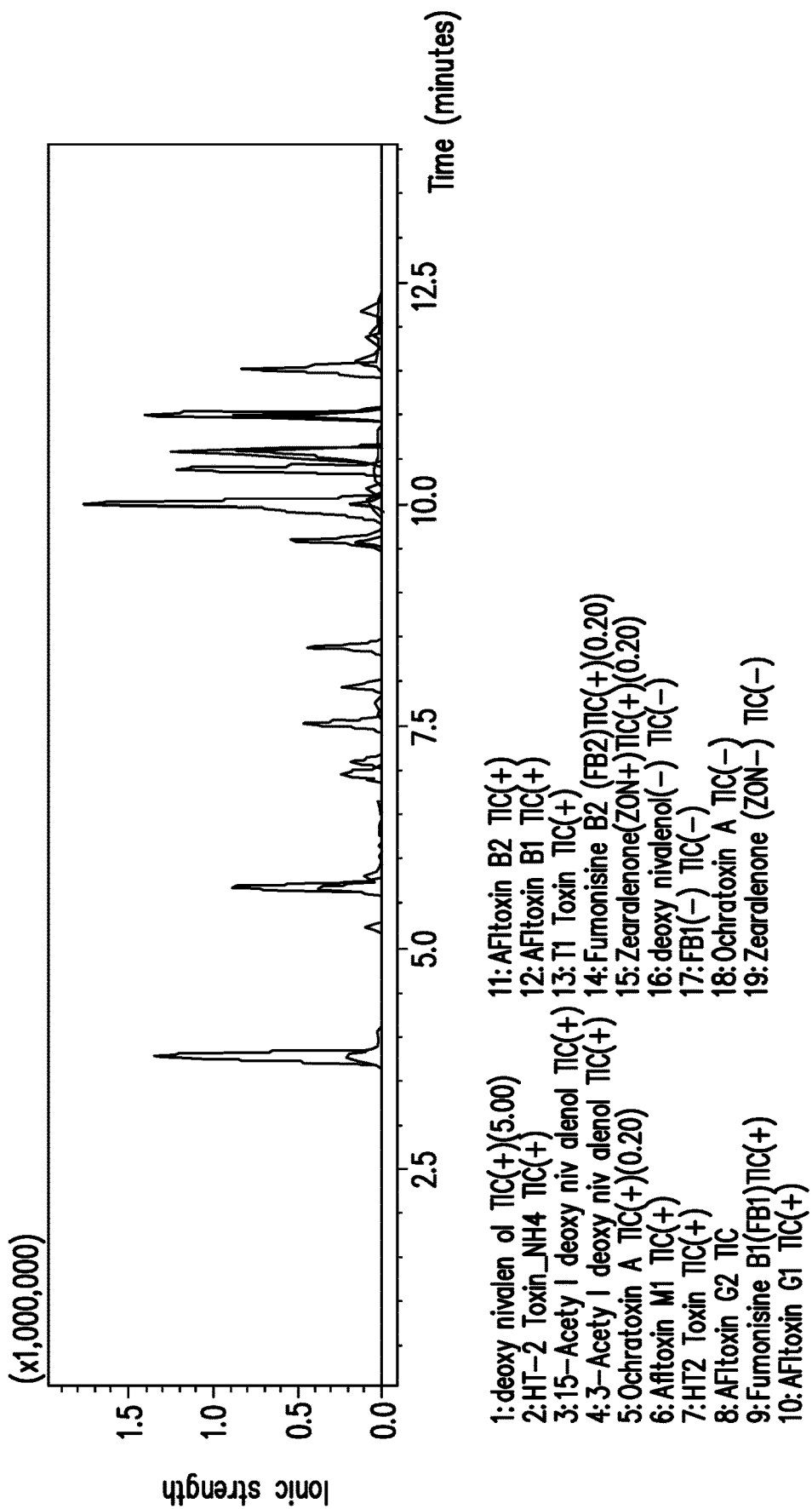
FIG. 1B is a gradient analysis chart obtained by liquid chromatography of various toxins using the liquid chromatography reagent kit of the invention in Example 1.

FIG. 1B is a gradient analysis chart obtained by liquid chromatography of various toxins using the liquid chromatography reagent kit of the invention in Example 1. In Example 1, the mobile phase anti-adsorption concentrate was formed using the liquid chromatography reagent kit of the invention and based on the ratio of the molarity of the buffer to the molarity of the acid-base regulating reagent, and the ratio of the molarity of the buffer to the molarity of the anti-adsorption reagent.

For example, in the mobile phase anti-adsorption concentrate, the ratio of the molarity of the buffer to the molarity of the acid-base regulating reagent was 40:1 to 10:1. The ratio of the molarity of the buffer to the molarity of the anti-adsorption reagent was 10:1 to 1:2. The molarity of the buffer was 20 mM to 200 mM. The molarity of the acid-base regulating reagent was 0.5 mM to 20 mM. The ratio of the molarity of the buffer to the molarity of the anti-adsorption reagent was in the range of 100:1 to 1:2, and the molarity of the anti-adsorption reagent was less than or equal to 400 mM.

Next, the mobile phase anti-adsorption concentrate was diluted substantially 200-fold to obtain an operating mobile phase. Or, in other embodiments, the mobile phase anti-adsorption concentrate may be optionally diluted by the sample return solution. The molarity of the buffer in the operating mobile phase was 0.1 mM to 1 mM, and the molarity of the acid-base regulating reagent in the operating mobile phase was 0.0025 mM to 0.1 mM. The molarity of the anti-adsorption reagent was less than or equal to 2 mM. In this way, at least part of the components of the operating mobile phase may have the functions of buffer and anti-adsorption at the same time, or may have the functions of anti-adsorption and acid-base regulation at the same time.

According to some other embodiments of the invention, after the mobile phase anti-adsorption concentrate was diluted 200-fold, the mobile phase anti-adsorption concentrate may be added to the operating mobile phase of 0.1% formic acid as shown in Comparative example 1, as a system anti-adsorption reagent, but is not limited thereto.

It should be mentioned here that, the operating mobile phase shown in Example 1 was a mobile phase obtained after the mobile phase anti-adsorption concentrate was diluted, and the ratio of the molarity of the buffer to the molarity of the acid-base regulating reagent thereof and the ratio of the molarity of the buffer to the molarity of the acid-base regulating reagent in the mobile phase anti-adsorption concentrate may be the same (such as 400:1 to 1:1, or 40:1 to 10:1). Or, the ratio of the molarity of the buffer to the molarity of the anti-adsorption reagent in the operating mobile phase and the ratio of the molarity of the buffer to the molarity of the anti-adsorption reagent in the mobile phase anti-adsorption concentrate may be the same (such as 100:1 to 1:2, or 10:1 to 1:2).

Then, various toxin samples to be tested were dissolved in the operating mobile phase to form a solution to be tested.

Next, the solution to be tested was loaded by a non-metallic connecting tube and a non-metallic chromatography column in the liquid chromatography reagent kit for liquid chromatography, and detected by a mass spectrometer, to obtain the gradient analysis chart of FIG. 1B.

As shown in FIG. 1A, the gradient analysis chart of Comparative example 1 shows that the toxin samples may be separated within 12.5 minutes (X-axis). It may be seen from FIG. 1A that the mobile phase prepared with general 0.1% formic acid and water/methanol may produce an ionic strength (Y-axis) signal with the strongest peak of the toxin at about $0.6\times10^6$.

Please refer to FIG. 1A and FIG. 1B at the same time. As shown in FIG. 1B, the gradient analysis chart of Example 1 using the liquid chromatography reagent kit of the invention shows that the toxin samples may be separated within the same time. Moreover, the combination of the mobile phase prepared by the liquid chromatography reagent kit of the invention and the anti-adsorption reagent may produce an ionic strength signal with the strongest peak of the toxin at about $1.8\times10^6$. In other words, after using the liquid chromatography reagent kit of the invention, the sensitivity of liquid chromatography may be significantly improved. Compared to Comparative example 1, the ionic strength signal of Example 1 using the liquid chromatography reagent kit of the invention grew by at least 3 to 5 times. In addition, the ionic strength signal of some toxin samples grew by about 10 times or more. That is, the use of the liquid chromatography reagent kit of the present application may effectively avoid the adsorption of ions to the metal surface, and may reduce phenomena such as sample loss, delayed peaking, and signal peak deformation. In this way, the liquid chromatography reagent kit of the present application may effectively improve the sensitivity of liquid chromatography and significantly improve detection effect.

<Comparative Example 2-1> and <Comparative Example 2-2>

Figure 2A:
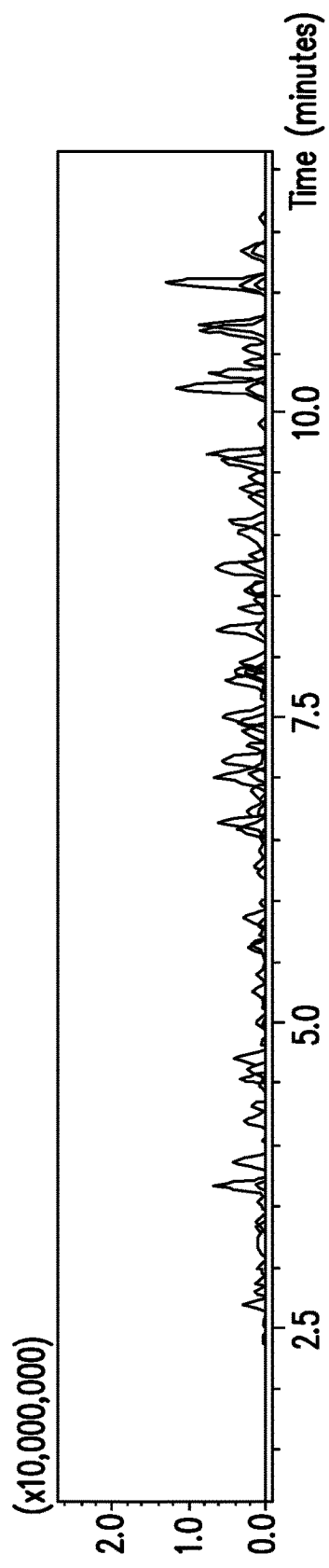
FIG. 2A is a gradient analysis chart obtained by liquid chromatography of various pesticides using 5 mM ammonium acetate in Comparative example 2-1.

FIG. 2A is a gradient analysis chart obtained by liquid chromatography of various pesticides using 5 mM ammonium acetate in Comparative example 2-1. In Comparative example 2, the mobile phase may be formed using a mixture of ammonium acetate, water, and methanol to obtain a mobile phase of 5 mM ammonium acetate.

Then, the samples of 203 pesticides to be tested were dissolved in the mobile phase of 5 mM ammonium acetate to form a solution to be tested.

Next, the solution to be tested was loaded by a chromatography column for liquid chromatography, and detected by a mass spectrometer, to obtain the gradient analysis chart of FIG. 2A.

Figure 2B:
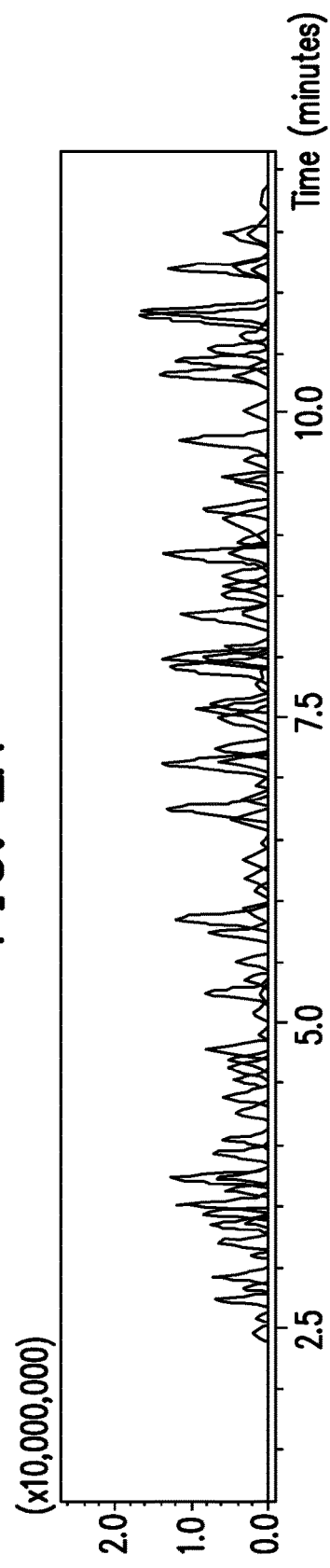
FIG. 2B is a gradient analysis chart obtained by liquid chromatography of various pesticides using 5 mM ammonium acetate and the liquid chromatography reagent kit of the invention in Comparative example 2-2.

FIG. 2B is a gradient analysis chart obtained by liquid chromatography of various pesticides using 5 mM ammonium acetate and the liquid chromatography reagent kit of the invention in Comparative example 2-2. The method of forming the mobile phase of Comparative example 2-2 was substantially similar to that of Comparative example 2-1, and the difference was that: after the mobile phase anti-adsorption concentrate included in the liquid chromatography reagent kit of the invention was diluted 200-fold with a sample return solution, the mobile phase anti-adsorption concentrate was mixed with the mobile phase of 5 mM ammonium acetate shown in Comparative example 2-1 to obtain a mobile phase of 5 mM ammonium acetate including the liquid chromatography reagent kit of the invention. Under the above settings, the mobile phase anti-adsorption concentrate may be used as a system anti-adsorption agent.

Then, the samples of the 203 pesticides to be tested were dissolved in the mobile phase of 5 mM ammonium acetate including the liquid chromatography reagent kit of the invention to form a solution to be tested.

Next, the solution to be tested was loaded by a chromatography column for liquid chromatography, and detected by a mass spectrometer, to obtain the gradient analysis chart of FIG. 2B.

Example 2

Figure 2C:
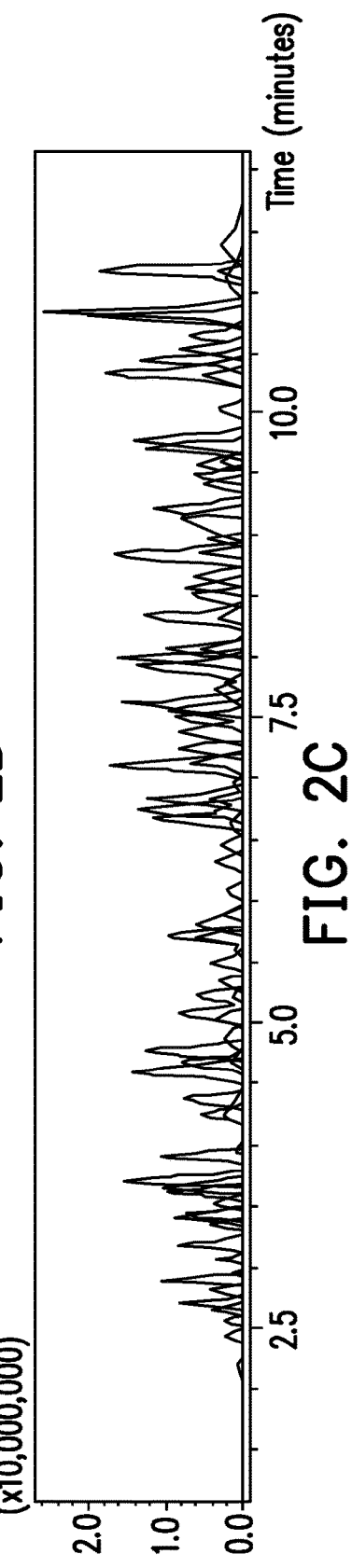
FIG. 2C is a gradient analysis chart obtained by liquid chromatography of various pesticides using the liquid chromatography reagent kit of the invention in Example 2.

FIG. 2C is a gradient analysis chart obtained by liquid chromatography of various pesticides using the liquid chromatography reagent kit of the invention in Example 2. Example 2 adopted the liquid chromatography reagent kit of the invention, including the mobile phase anti-adsorption concentrate formed using the liquid chromatography reagent kit of the invention.

For example, in the mobile phase anti-adsorption concentrate, the ratio of the molarity of the buffer to the molarity of the acid-base regulating reagent was 20:1 to 1:1. The ratio of the molarity of the buffer to the molarity of the anti-adsorption reagent was 100:1 to 5:1. The molarity of the buffer was 20 mM to 500 mM. The molarity of the acid-base regulating reagent was 20 mM to 100 mM. The molarity of the anti-adsorption reagent was less than or equal to 100 mM.

Next, the mobile phase anti-adsorption concentrate was diluted 200-fold to obtain an operating mobile phase.

Then, the samples of the 203 pesticides to be tested were dissolved in the operating mobile phase to form a solution to be tested.

Next, the solution to be tested was loaded by a chromatography column for liquid chromatography, and detected by a mass spectrometer, to obtain the gradient analysis chart of FIG. 2C.

As shown in FIG. 2A, FIG. 2B, and FIG. 2C, the gradient analysis charts of Comparative example 2-1, Comparative example 2-2, and Example 2 show that various pesticides may be chromatographically separated within 12 minutes (X-axis) to obtain ion concentration signals (Y-axis). It may be seen from FIG. 2A that in Comparative example 2-1, the strongest peak of the pesticides detected by the mobile phase prepared with general 5 mM ammonium acetate and water/methanol was an ionic strength signal at about $1.2 \times 10^6$. It may be seen from FIG. 2B that in Comparative example 2-2, the strongest peak of the pesticides detected by the mobile phase prepared by mixing 5 mM ammonium acetate and water/methanol with the liquid chromatography reagent kit of the present application was an ionic strength signal at about $1.6 \times 10^6$. It may be seen from FIG. 2C that the strongest peak of the pesticides detected by the mobile phase including the anti-adsorption reagent prepared by the liquid chromatography reagent kit of the present application was an ionic strength signal at about $2.6 \times 10^6$. In other words, after using the liquid chromatography reagent kit of the invention, the sensitivity of liquid chromatography may be significantly improved. Moreover, since Comparative example 2-2 adopted the liquid chromatography reagent kit of the present application (including: buffer, acid-base regulating reagent, and anti-adsorption reagent) and 5 mM ammonium acetate, the average sensitivity was increased by about 2.8 times compared to Comparative example 2-1. In addition, since Example 2 only adopted the liquid chromatography reagent kit of the present application, the average sensitivity was increased by about 5.2 times compared to Comparative example 2-1.

Table 1 and Table 2 below record the sensitivity multiples of Example 2 and Comparative example 2-2 relative to Comparative example 2-1, and the number of pesticide samples corresponding to the sensitivity multiples. Table 1 defines the sensitivity multiples as the ion concentration (for example: the area of each peak) of each pesticide sample detected in Example 2 divided by the ion concentration (for example: the area of each peak) of each pesticide sample detected in Comparative example 2-1, or the ion concentration of each pesticide sample detected in Comparative example 2-2 divided by the ion concentration of each pesticide sample detected in Comparative example 2-1.

TABLE 1

| Sensitivity multiple (for example: calculated by the area of the peak) | Comparative Example 2-2 | Example 2 |
| --- | --- | --- |
| <0.5 | 9 | 5 |
| 0.5 to 1 | 10 | 3 |
| 1 to 2 | 56 | 18 |
| 2 to 5 | 98 | 109 |
| 5 to 10 | 26 | 45 |
| >10 | 4 | 23 |
| Total | 203 | 203 |

Table 2 defines the sensitivity multiples as the ionic strength signal (for example: the maximum height of each peak) of each pesticide sample detected in Example 2 divided by the ionic strength signal (for example: the maximum height of each peak) of each pesticide sample detected in Comparative example 2-1, or the ionic strength signal of each pesticide sample detected in Comparative example 2-2 divided by the ionic strength signal of each pesticide sample detected in Comparative example 2-1.

TABLE 2

| Sensitivity multiple (for example: calculated by the maximum height of the peak) | Comparative Example 2-2 | Example 2 |
| --- | --- | --- |
| <0.5 | 10 | 6 |
| 0.5 to 1 | 11 | 10 |
| 1 to 2 | 79 | 21 |
| 2 to 5 | 80 | 108 |
| 5 to 10 | 19 | 42 |
| >10 | 4 | 16 |
| Total | 203 | 203 |

It may be seen from Table 1 above that the mobile phase used in Comparative example 2-2 may increase the sensitivity of liquid chromatography for 98 pesticide samples out of 203 pesticide samples by 2 to 5 times. In addition, it may be seen from Table 2 above that the mobile phase used in Comparative example 2-2 may increase the sensitivity of liquid chromatography for 80 pesticide samples out of 203 pesticide samples by 2 to 5 times. In other words, compared to Comparative example 2-1, in Comparative example 2-2, mixing the liquid chromatography reagent kit of the invention using a commonly used mobile phase had the effect of improving sensitivity.

Moreover, it may be known from the content of Table 1 that the liquid chromatography reagent kit of the invention used in Example 2 (including only the content of the liquid chromatography reagent kit of the present application) may further increase the sensitivity of liquid chromatography for 109 pesticide samples by 2 to 5 times, increase the sensitivity of liquid chromatography for 45 pesticide samples by 5 to 10 times, and increase the sensitivity of liquid chromatography for 23 pesticide samples by more than 10 times. In addition, it may be seen from the content of Table 2 that the liquid chromatography reagent kit of the invention used in Example 2 may further improve the sensitivity of liquid chromatography for various pesticide samples. In other words, the liquid chromatography reagent kit of the invention may increase the sensitivity for detecting more types of pesticides, and the increased sensitivity multiples were higher, and therefore the signal strength detected by liquid chromatography may be significantly increased.

Comparative Example 3

Figure 3A:
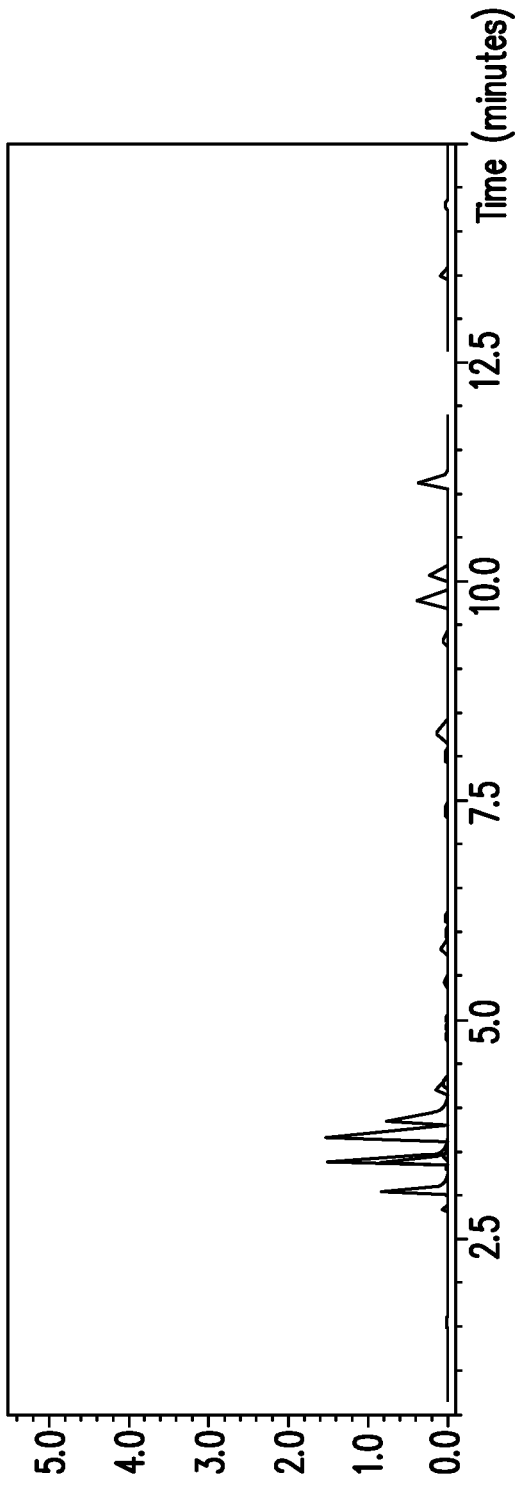
FIG. 3A is a gradient analysis chart obtained by liquid chromatography of various animal drugs using 0.1% formic acid in Comparative example 3.

FIG. 3A is a gradient analysis chart obtained by liquid chromatography of various animal drugs using 0.1% formic acid in Comparative example 3. In Comparative example 3, a mixture of formic acid, water, and methanol was used to obtain a mobile phase of 0.1% formic acid.

Then, the samples of 48 animal drugs to be tested were dissolved in the mobile phase of 0.1% formic acid to form a solution to be tested.

Next, the solution to be tested was loaded by a chromatography column for liquid chromatography, and detected by a mass spectrometer, to obtain the gradient analysis chart of FIG. 3A.

Example 3

Figure 3B:
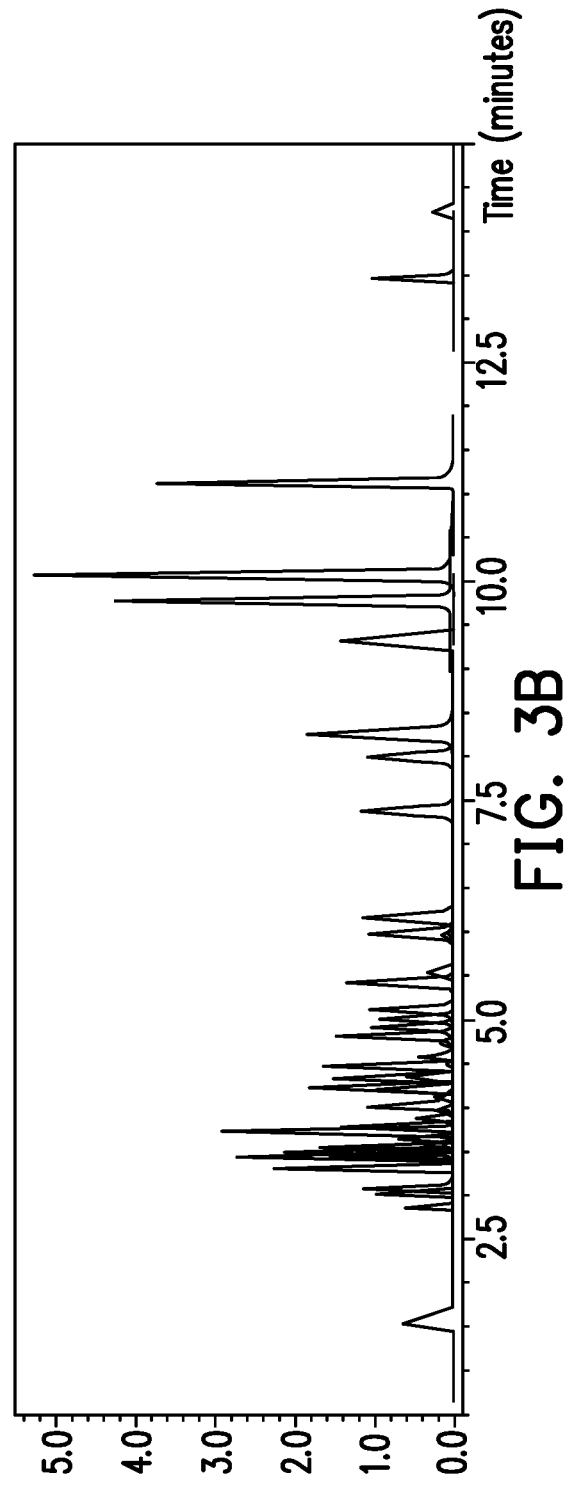
FIG. 3B is a gradient analysis chart obtained by liquid chromatography of various animal drugs using the liquid chromatography reagent kit of the invention in Example 3.

FIG. 3B is a gradient analysis chart obtained by liquid chromatography of various animal drugs using the liquid chromatography reagent kit of the invention in Example 3. Example 3 adopted the liquid chromatography reagent kit of the invention, including the mobile phase anti-adsorption concentrate formed using the liquid chromatography reagent kit of the invention.

For example, in the mobile phase anti-adsorption concentrate, the ratio of the molarity of the buffer to the molarity of the acid-base regulating reagent was 100:1 to 20:1. The ratio of the molarity of the buffer to the molarity of the anti-adsorption reagent was 10:1 to 1:2. The molarity of the buffer was 20 mM to 200 mM. The molarity of the acid-base regulating reagent was 0.5 mM to 20 mM. The molarity of the anti-adsorption reagent was less than or equal to 400 mM.

Next, the mobile phase anti-adsorption concentrate was diluted 200-fold to obtain an operating mobile phase.

Then, the samples of the 48 animal drugs to be tested were dissolved in the operating mobile phase to form a solution to be tested.

Next, the solution to be tested was loaded by a chromatography column for liquid chromatography, and detected by a mass spectrometer, to obtain the gradient analysis chart of FIG. 3B.

As shown in FIG. 3A, the gradient analysis chart of Comparative example 3 shows that the samples of animal drugs may be separated within 15 minutes (X-axis). It may be seen from FIG. 3A that the mobile phase prepared with 0.1% formic acid and water/methanol may produce an ionic strength (Y-axis) signal with the strongest peak of one of the animal drugs at about $1.6 \times 10^6$.

Please refer to FIG. 3A and FIG. 3B at the same time. As shown in FIG. 3B, the gradient analysis chart of Example 3 using the liquid chromatography reagent kit of the invention shows that the toxin samples may be separated within the same time. In addition, corresponding to the animal drug with the strongest peak in FIG. 3A, the mobile phase with the anti-adsorption reagent prepared by the liquid chromatography reagent kit of the invention may produce an ionic strength signal with the strongest peak of the animal drug at about $3.0 \times 10^6$. In other words, after using the liquid chromatography reagent kit of the invention, the ionic strength signal was increased by at least about 1.8 times.

In addition, the strongest peak of other animal drugs may further reach an ionic strength signal of about $5.2 \times 10^6$. In other words, after using the liquid chromatography reagent kit of the invention, the sensitivity of liquid chromatography may be significantly improved. Compared to Comparative example 3, the ionic strength signal of Example 3 using the liquid chromatography reagent kit of the invention grew by at least 1.8 to 52 times. The ionic strength signals of some animal drug samples increased by about 10 to 50 times or more, and the average increase in ionic strength signals was about 23.3 times. That is, the use of the liquid chromatography reagent kit of the present application may effectively avoid the adsorption of ions to the metal surface, and may reduce phenomena such as sample loss, delayed peaking, and signal peak deformation. In this way, the liquid chromatography reagent kit of the present application may effectively improve the sensitivity of liquid chromatography and significantly improve detection effect.

Table 3 below records the sensitivity multiples of Example 3 relative to Comparative example 3, and the number of animal drug samples corresponding to the sensitivity multiples. Table 3 defines the sensitivity multiples as the ion concentration (for example: the area of each peak) of each animal drug sample detected in Example 3 divided by the ion concentration (for example: the area of each peak) of each animal drug sample detected in Comparative example 3.

TABLE 3

| Sensitivity multiple (for example: calculated by the area of the peak) | Example 3 |
| --- | --- |
| <1 | 0 |
| 1 to 3 | 7 |
| 3 to 10 | 5 |
| 10 to 20 | 9 |
| 20 to 30 | 6 |
| 30 to 40 | 11 |
| 40 to 50 | 8 |
| 50 to 60 | 2 |
| Total | 48 |

It may be known from Table 3 that, the liquid chromatography reagent kit of the invention used in Example 3 (including only the content of the liquid chromatography reagent kit of the present application) may further increase the sensitivity of liquid chromatography for 9 animal drug samples by 10 times to 20 times, increase the sensitivity of liquid chromatography for 6 animal drug samples by 20 times to 30 times, increase the sensitivity of liquid chromatography for 11 animal drug samples by 30 times to 40 times, and increase the sensitivity of liquid chromatography for 8 animal drug samples by 40 times to 50 times. In other words, the liquid chromatography reagent kit of the invention may improve the detection sensitivity for animal drugs. From another perspective, since the liquid chromatography performed with the liquid chromatography reagent kit of the invention may significantly reduce the probability of the ions in the sample contacting the metal surface, the liquid chromatography reagent kit of the invention has excellent sensitivity and may significantly improve detection effect.

Based on the above, the liquid chromatography reagent kit of an embodiment of the invention adopts an anti-adsorption reagent, and therefore the probability of ions adsorbing to (or bonding to) the metal surface they contact during the liquid chromatography process may be reduced, thereby reducing sample loss. In addition, since the anti-adsorption reagent may reduce the adsorption of ions to the metal surface, the detected peak shape may also be improved and delayed peaking may be avoided, thus improving the sensitivity and the detection effect of liquid chromatography. In addition, since the materials of the connecting tube and the chromatography column provided by the liquid chromatography reagent kit are non-metallic materials, the contact area between the sample and the metal may be reduced, thus further reducing the probability of ions in the sample adsorbing to (or bonding to) the metal surface. As a result, the signal strength detected by liquid chromatography is significantly increased, and therefore the sensitivity and the detection effect of liquid chromatography are improved.

What is claimed is:

1. A liquid chromatography reagent kit, comprising:
    a mobile phase anti-adsorption concentrate, comprising:
        a first solvent;
        a buffer;
        an acid-base regulating reagent; and
        an anti-adsorption reagent,
    wherein a ratio of a molarity of the buffer to a molarity of the acid-base regulating reagent is 400:1 to 1:1;
    wherein a ratio of the molarity of the buffer to a molarity of the anti-adsorption reagent is 100:1 to 1:2.
2. The liquid chromatography reagent kit of claim 1, wherein the ratio of the molarity of the buffer to the molarity of the acid-base regulating reagent is 40:1 to 10:1, and the ratio of the molarity of the buffer to the molarity of the anti-adsorption reagent is 10:1 to 1:2.

3. The liquid chromatography reagent kit of claim 1, wherein the molarity of the buffer is 20 mM to 200 mM.

4. The liquid chromatography reagent kit of claim 1, wherein the molarity of the acid-base regulating reagent is 0.5 mM to 20 mM.

5. The liquid chromatography reagent kit of claim 1, wherein the first solvent is one selected from a group consisting of water, methanol, ethanol, isopropanol, and acetonitrile.

6. The liquid chromatography reagent kit of claim 1, wherein the buffer is one selected from a group consisting of ammonium formate, ammonium acetate, ammonium carbonate, ammonium bicarbonate, ammonium fluoride, and ammonium citrate.

7. The liquid chromatography reagent kit of claim 1, wherein the acid-base regulating reagent is one selected from a group consisting of formic acid, acetic acid, citric acid, carbonic acid, and ammonia water.

8. The liquid chromatography reagent kit of claim 1, wherein the molarity of the anti-adsorption reagent is at least less than or equal to 5000 mM.

9. The liquid chromatography reagent kit of claim 1, wherein the molarity of the anti-adsorption reagent is less than or equal to 400 mM.

10. The liquid chromatography reagent kit of claim 1, further comprising a sample return solution, wherein the sample return solution comprises a second solvent.

11. The liquid chromatography reagent kit of claim 10, wherein the second solvent is one selected from a group consisting of water, methanol, ethanol, isopropanol, and acetonitrile.

12. The liquid chromatography reagent kit of claim 1, wherein the anti-adsorption reagent is one selected from a group consisting of formic acid, acetic acid, citric acid, carbonic acid, ammonia water, ammonium formate, ammonium acetate, ammonium carbonate, ammonium bicarbonate, ammonium fluoride, ammonium citrate, sodium formate, sodium acetate, sodium carbonate, sodium bicarbonate, sodium fluoride, and sodium citrate.

13. The liquid chromatography reagent kit of claim 1, further comprising:

a connecting tube; and a chromatography column, wherein the chromatography column is connected to the connecting tube, wherein a material of the connecting tube is a non-metallic material, wherein a material of the chromatography column is a non-metallic material.

14. The liquid chromatography reagent kit of claim 1, wherein the mobile phase anti-adsorption concentrate is diluted to obtain an operating mobile phase, and in the operating mobile phase, the ratio of the molarity of the buffer to the molarity of the acid-base regulating reagent is 400:1 to 1:1, and the ratio of the molarity of the buffer to the molarity of the anti-adsorption reagent is 100:1 to 1:2.

15. The liquid chromatography reagent kit of claim 14, wherein the mobile phase anti-adsorption concentrate is substantially diluted 200-fold to obtain the operating mobile phase.

16. The liquid chromatography reagent kit of claim 1, wherein the ratio of the molarity of the buffer to the molarity of the acid-base regulating reagent is 20:1 to 1:1, and the ratio of the molarity of the buffer to the molarity of the anti-adsorption reagent is 100:1 to 5:1.

17. The liquid chromatography reagent kit of claim 16, wherein the molarity of the buffer is 20 mM to 500 mM, and the molarity of the acid-base regulating reagent is 20 mM to 100 mM.

18. The liquid chromatography reagent kit of claim 16, wherein the molarity of the anti-adsorption reagent is less than or equal to 100 mM.

19. The liquid chromatography reagent kit of claim 1, wherein the ratio of the molarity of the buffer to the molarity of the acid-base regulating reagent is 100:1 to 20:1, and the ratio of the molarity of the buffer to the molarity of the anti-adsorption reagent is 10:1 to 1:2.

20. The liquid chromatography reagent kit of claim 19, wherein the molarity of the buffer is 20 mM to 200 mM, the molarity of the acid-base regulating reagent is 0.5 mM to 20 mM, and the molarity of the anti-adsorption reagent is less than or equal to 400 mM.

* * * * *